Oct. 1, 1946.                T. J. GOTHARD                2,408,511
                               FOG-NOZZLE
                          Filed Oct. 27, 1943
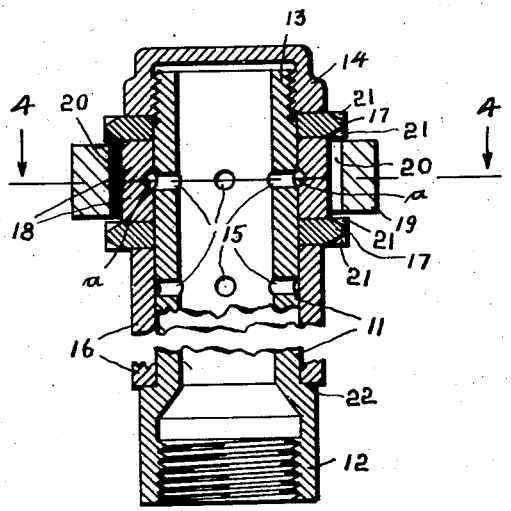
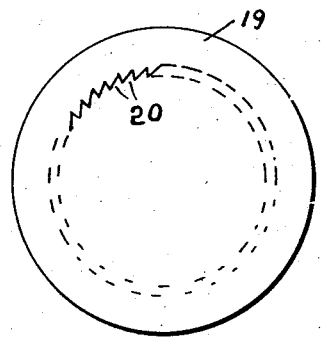
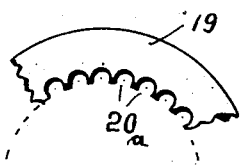
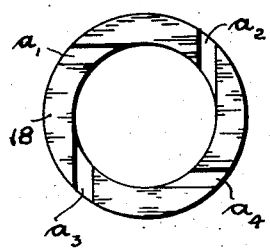
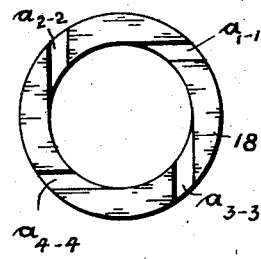
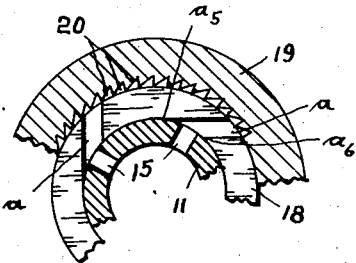
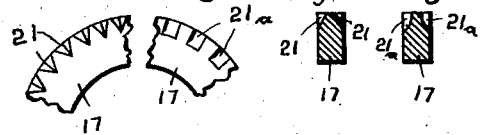
Thomas J. Gothard
Inventor:
Witness
Harry J. Keeley Patented Oct. 1, 1946

2,408,511

UNITED STATES PATENT OFFICE 2,408,511

FOG NOZZLE

Thomas J. Gothard, Los Angeles, Calif.

Application October 27, 1943, Serial No. 507,790

6 Claims. (Cl. 299—126)

My invention relates more particularly to such devices that are used for breaking up a liquid or other suitable matter to such an extent as to form a fine fog-like spray on being discharged into the open air.

The objects of this invention are, first, to provide a rotating, mist- or fog-producing, internally-driven control-member; second, to provide tangentially-acting jets in a centrally disposed structure; third, to make this structure in part of a split ring in oppositely disposed sections with cooperating grooves or channels in the opposite faces; fourth, to mount these several parts in units, of which more or less may be combined to assure a desired amount of fog, or desired amount of discharged matter; and having other details and features that may easily be recognized and understood from the following specification, appended claims, and accompanying drawing, in which—

Fig. 1 is a fragmentary vertical mid-sectional view of the complete fog-nozzle; Fig. 2, a planview of the rotor with sharp-edged pockets; Fig. 3, a fragmentary plan-view of a slightly modified form of rotor, with rounded actuating pockets; Fig. 4, a fragmentary section through the assembly on line 4—4 of Fig. 1; Figs. 5 and 6, the oppositely disposed faces of the jet-ring-sections; Figs. 7, 8, 9 and 10, fragmentary plan-views and cross sections of slightly modified forms of deflecting rings.

Similar numerals refer to similar parts throughout the several views and throughout the specification.

The central tubing member 11 is provided with a threaded portion 12 at one end, by which the device may be applied to any liquid-supplying apparatus, such as a water main; and has, at the opposite end another threaded portion 13, to which a cap 14 may be applied to hold all other parts in proper position on the tubing member. The tubing member is also provided with a number of supply-openings 15 by which a supplied liquid, or other matter, may escape from the inside of the tubing towards the outside.

Right here it should be understood that matter to be handled by this present device and invention is not only necessarily plain water, or even liquid, but that gaseous, or other sorts of mixtures, may be agitated suitably to discharge in form of a desired fog.

Moreover, inasmuch as it is a quite common requirement that a smaller or larger amount of fog be produced from one and the same supply line, the device is designed so as to facilitate such a change without material reconstruction of the supply line.

The fog-producing parts are assembled in certain units, of which more or less units may easily be brought into operation on the same termination of the supply line, the termination being the tubing member 11. When less units are wanted, a plain tubing in form of a sleeve 16 is placed over a portion of the tubing member 11 whereby some of the supply-openings 15 are maintained closed. The tubing member 11 can be made in any desired or required length to facilitate the use of any desired number of units of fog-producing parts.

One, or each of such units consists of deflecting rings 17; a split, or sectioned jet-ring 18; and the rotor 19.

When two, or more, of the units are in use, one deflecting ring may be sufficient between two adjoining units.

In such a case, the deflecting ring is simply provided with notches 21 on both edges, though the outer rings, one near the top, that is below the cap 14, and the other ring near the bottom, against the shoulder 22 of the central tubing 11, where the outer sides and edges would have no effect on any discharge from this fog-nozzle, need no notching. The purpose of this notching will be described presently.

Matter, to pass through this fog-nozzle, enters through the end 12 of the central tubing member, to then escape through the openings 15, from which it passes through channels $a$, that act in the manner of jets towards the rotor 19, which for this purpose is provided with cross-pockets 20, of which the ends face the previously-named notches 21, to thereby discharge from this device.

The channels $a$ are provided in the oppositely disposed faces of the halves of the ring 18 in the manner more clearly illustrated in Figs. 5 and 6; the channel $a_1$ in the face of one ring-half being disposed in the opposite direction of the channel $a_{1-1}$ in the face of the other ring-half so that, when the two ring-halves are put face to face, these two half-channels form a single jet to act upon the rotor. The other channels $a_2$ & $a_{2-2}$; $a_3$ & $a_{3-3}$; and $a_4$ & $a_{4-4}$ complete the jet system as illustrated. However, it should be understood that more or less jets can be provided, being in practice largely a matter of requirement as to the amount to be discharged through this device.

The cross-pockets of the rotor, of course, also, may be of different form, sharp-cornered as illustrated in Fig. 2, rounded as illustrated in Fig. 3, or otherwise when so desired or required.

And, also, the deflecting rings may have V-shaped, sharp-cornered notches 21 as illustrated in Figs. 7 and 9, or square-shaped as illustrated in Figs. 8 and 10, or otherwise.

The spacing of the rotor 19 is shown somewhat more than it may be in actual practice. This showing is made only to indicate that the rotor is free to move between the adjoining deflecting-rings for illustrative reasons, since all the other parts are assembled on the central tubing member 11 tightly pressed between the shoulder 22 and the cap 14 whereby any passing or handled matter is prevented from escaping any other way but through the described channels, openings, and jets, and notches, and cross-pockets.

This arrangement also facilitates a quick and easy exchange and arrangement of units when more or less units are wanted. On a removal of the cap, the units may be removed or replaced, the rings 17 and 18 being not at all necessarily tight-fitting on the tubing member 11, the end-clamping by the cap taking care of sealing requirements.

The tubing member 11 is made long enough to allow an arrangement of the desired number of units between the cap and the shoulder 22; different lengths of sleeves 16 being provided to facilitate the mounting of more or less units, a shorter sleeve, or none at all, being slipped on when more units are desired on the tubing 11.

The matter passing through this device is broen up, vaporized, diffused, or suitably converted into a fine fog, by the fact that it is forced against so many cross-faces that are even suitably roughened, as by the cross-notches in the rotor, and, particularly, when passing from the cross-notches of the rotor against the notched edges of the deflecting rings while the rotor is in motion, the different cross-notches of the rotor passing the different notches on the edges of the deflecting rings.

From the above, it should be understood that the rotor is acted upon in practically all directions radially as the rotor moves about the jet ring, and, inasmuch as the rotor discharges towards both ends against the two oppositely disposed deflecting rings, such discharging, also, acts upon the rotor from both ends, to result in a floating support for the rotor, not to require any bearing action, and not being subject to any frictional wear-off or retarding, so that the rotor may thereby rotate so much more readily to the slightest pressure, and to, thereby, cause a so much more effective vaporizing of the passing matter.

While I am aware of the manufacture and use of other fog-nozzles, I claim:

1. In a fog-nozzle, a tubing with radially extending openings for discharge, a sectioned ring with matching channels in oppositely disposed faces of the sections in form of jets which are in communication with said openings and formed to discharge tangentially from the ring, deflecting rings with vaporizing edges extending beyond the peripheral contours of the first-named ring, and a rotor on the first-named ring and between the deflecting rings and having actuating means in its inner face in a position to be acted upon by said jets and to discharge towards said vaporizing edges.

2. In a fog-nozzle, a deflecting-ring having deflecting and vaporizing notches in the opposite flat faces open towards the circumferential edge of the ring.

3. In a fog-nozzle, a tubing member having connecting means at one end formed to serve for connection with a supply source and having connecting means at the opposite end for engaging a closing cap and having furthermore a shoulder portion on the outside near the first-named end and having also outlet openings extending from the inside towards the outside, a ring having jets extending from its inner cylindrical face in communication with said openings towards its outer cylindrical face in a tangential direction from the point of communication with the openings, deflecting-rings having deflecting notches in portions of the flat faces outside of the adjoining jet-ring and open towards the peripheral edges of the deflecting-rings, a rotor on the first-named jet-ring and between the deflecting-rings and having actuating pockets in its inner cylindrical face and extending towards both flat faces of the rotor to discharge towards the oppositely disposed deflecting rings and particularly towards the deflecting notches, a cap engaging the second-named connecting means of the tubing member for holding the several rings tightly against said shoulder portion, and an adapter-sleeve to facilitate the mounting of any required number of units of rings and rotors between the cap and the shoulder portion.

4. In a fog-nozzle, a central supply structure having an outer cylindrical contour about a longitudinal axis and embodying means to discharge secantly of said cylindrical contour and in a plane crosswise to said axis, a rotor with a cylindrical inner face in which there are actuating grooves parallel to said axis and crosswise to said discharge, and discharge-deflecting means slightly spaced from said rotor and on opposite sides thereof in the path of discharge from said grooves, whereby the rotor is disposed floatingly by the discharge between these deflecting means and about said structure.

5. In a fog-nozzle, a jet-ring with cylindrical inner and outer faces about a common longitudinal axis and made in sections each of which is provided with a face crosswise to the first-named axis and faces and each of such thirdly-named faces having channels secantly of said outer face and extending from said inner to said outer cylindrical faces, the channels of one section and the channels in the other section being designed to unite to form joint-jets in the combined sections of a jet-ring.

6. In a fog-nozzle, a central supply structure embodying discharge jets, and a rotor turnably mounted on said structure and having an inner cylindrical face about a central longitudinal axis, said face being provided with actuating grooves designed to receive discharges passing through said jets for rotating the rotor under direct action of such discharges, the grooves being parallel to said axis and crosswise to said jets throughout the length of said cylindrical face.

THOMAS J. GOTHARD.